US010565760B2

(12) United States Patent
Sullivan et al.

(10) Patent No.: US 10,565,760 B2
(45) Date of Patent: Feb. 18, 2020

(54) AUGMENTED REALITY KIOSK SYSTEM AND METHOD

(71) Applicant: Toshiba America Business Solutions, Inc., Irvine, CA (US)

(72) Inventors: Lee Michael Sullivan, Lake Forest, CA (US); Bill Melo, Laguna Hills, CA (US)

(73) Assignee: Toshiba America Business Solutions, Inc., Irvine, CA (US)

(*) Notice: Subject to any disclaimer, the term of this patent is extended or adjusted under 35 U.S.C. 154(b) by 0 days.

(21) Appl. No.: 15/674,995

(22) Filed: Aug. 11, 2017

(65) Prior Publication Data

US 2017/0337722 A1    Nov. 23, 2017

Related U.S. Application Data

(63) Continuation-in-part of application No. 14/937,461, filed on Nov. 10, 2015.

(60) Provisional application No. 62/373,583, filed on Aug. 11, 2016, provisional application No. 62/077,696, filed on Nov. 10, 2014.

(51) Int. Cl.
| | |
|---|---|
| *G06T 11/60* | (2006.01) |
| *G06F 3/00* | (2006.01) |
| *H04W 4/02* | (2018.01) |
| *H04W 4/80* | (2018.01) |
| *H04L 29/08* | (2006.01) |
| *G06Q 20/32* | (2012.01) |
| *G06Q 20/18* | (2012.01) |
| *H04L 29/06* | (2006.01) |
| *G06Q 20/12* | (2012.01) |
| *G06F 3/0484* | (2013.01) |
| *H04W 88/02* | (2009.01) |

(52) U.S. Cl.
CPC .............. *G06T 11/60* (2013.01); *G06F 3/002* (2013.01); *G06Q 20/123* (2013.01); *G06Q 20/18* (2013.01); *G06Q 20/3224* (2013.01); *G06Q 20/3278* (2013.01); *H04L 65/60* (2013.01); *H04L 67/06* (2013.01); *H04L 67/10* (2013.01); *H04L 67/125* (2013.01); *H04L 67/18* (2013.01); *H04L 67/38* (2013.01); *H04W 4/023* (2013.01); *H04W 4/80* (2018.02); *G06F 3/04842* (2013.01); *G06Q 2220/16* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 9,418,360 B1* | 8/2016 | Cronin | G06Q 20/209 |
| 2013/0095924 A1* | 4/2013 | Geisner | G06F 3/012 |
| | | | 463/32 |

(Continued)

*Primary Examiner* — Yu Chen
(74) *Attorney, Agent, or Firm* — Ulmer & Berne LLP

(57) ABSTRACT

A method and system for generating an augmented reality image includes a kiosk and mobile computing device executing an application for interacting with the kiosk. The kiosk switches from a first set of images to a second set of image when the mobile computing device is proximate to the kiosk. A user selects one of the second set of images and the mobile computing device receives an augmented reality image according to the user selection. The mobile computing device combines the augmented reality image with a live image from a camera of the mobile computing device.

20 Claims, 9 Drawing Sheets

(56) References Cited

U.S. PATENT DOCUMENTS

| | | | |
|---|---|---|---|
| 2014/0178029 A1* | 6/2014 | Raheman | H04N 5/772 386/224 |
| 2014/0333664 A1* | 11/2014 | Williams | G06Q 30/0643 345/633 |
| 2015/0279101 A1* | 10/2015 | Anderson | G06F 16/954 345/633 |
| 2016/0092034 A1* | 3/2016 | Pillai | G06F 3/017 715/733 |
| 2017/0256124 A1* | 9/2017 | Arumugam | G07F 17/3255 |
| 2018/0232792 A1* | 8/2018 | Williams | G06F 17/3002 |

\* cited by examiner

AUGMENTED REALITY KIOSK SYSTEM AND METHOD

REFERENCE TO RELATED APPLICATION

The present application claims the benefit of U.S. Provisional Application Ser. No. 62/373,583, entitled AUGMENTED REALITY MEDIA KIOSK, filed Aug. 11, 2016, and is also a continuation in part of U.S. application Ser. No. 14/937,461, entitled SYSTEM AND METHOD FOR AN ON DEMAND MEDIA KIOSK, filed Nov. 10, 2015, which claimed the benefit of U.S. Provisional Application Ser. No. 62/077,696, entitled SYSTEM AND METHOD FOR TOUCH AND GET ON DEMAND MEDIA KIOSK, filed Nov. 10, 2014, and hereby incorporates the same applications herein by reference in their entirety.

TECHNICAL FIELD

The subject application teaches example embodiments that relate generally to kiosks configured to generate augmented reality images on mobile computing devices, and specifically to kiosks configured to generate customizable augmented reality images, promotions, and advertising on proximate user mobile computing devices.

BACKGROUND

Kiosks can provide a convenient way for consumers and users to obtain a service or product without having to wait for assistance from a human attendant. Consumers routinely use kiosks to check in at airports to obtain airline tickets, to view coupons and other discounts at supermarkets, and to purchase products such as food, beverages, and small electronics.

Radio-based and induction-based wireless communication protocols enable high speed networking between devices such as mobile computing devices, remote servers, and kiosks. Mobile computing devices, such as smartphones, cellphones, and tablet devices, execute applications, or mobile apps, that allow users to take pictures, play games, browse the Internet, communicate with one another, and so forth.

SUMMARY

In an example embodiment, a method includes displaying a first set of images on a kiosk, displaying a second set of images on the kiosk when it is determined that a mobile computing device is in proximity of the kiosk, and receiving a user selection of one of the second set of images. The method includes combining an augmented reality image associated with the user selection with a live image from a camera on the mobile computing device. The method can include transferring the augmented reality image to the mobile computing device from either the kiosk or a remote content server.

In an example embodiment, a system includes a kiosk, a means for associating a mobile computing device with the kiosk, and a wireless communication interface that is configured to transfer data between the mobile computing device and an associated mobile computing device. Data transferred to the associated mobile computing device includes an augmented reality image that is combined with a live image taken by a camera of the associated mobile computing device. The kiosk can be configured to display a first set of images when a mobile computing device is not associated with the kiosk and a second set of images when a mobile computing device is associated with the kiosk. A user selection of one of the second set of images determines which augmented reality image is combined with the live image on the mobile computing device.

In an example embodiment, a kiosk includes a display that displays a first set of images when a mobile computing device is not in proximity of the kiosk and a second set of images when a mobile computing device is in proximity of the kiosk. An embedded controller determines when the mobile computing device is in proximity to the kiosk and accepts a user selection of one of the second set of images. A communications interface transfers an augmented reality image to the mobile computing device based on the user selection, and the mobile computing device combines the augmented reality image with a live image from a camera of the mobile computing device.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
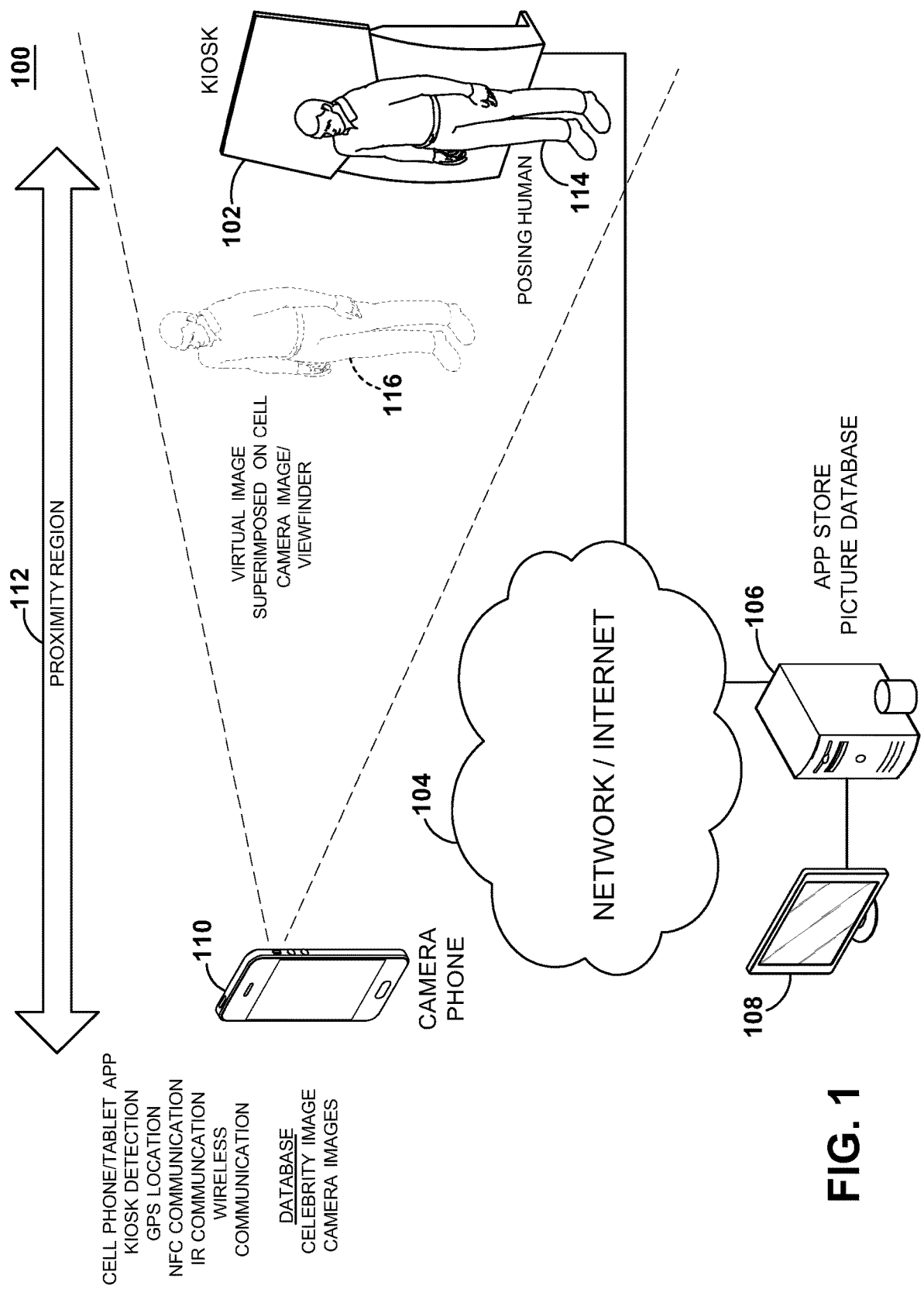
FIG. 1 is a system diagram of an augmented reality kiosk in accordance with an embodiment of the disclosure.

Various non-limiting embodiments of the present disclosure will now be described to provide an overall understanding of the principles of the structure, function, and use of systems, apparatuses, devices, and methods disclosed herein. One or more examples of these non-limiting embodiments are illustrated in the selected examples disclosed and described in detail with reference made to the figures in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated by those of ordinary skill in the art that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack.

Referring now to FIG. 1, a diagram of an augmented reality kiosk system 100 is presented. The augmented reality kiosk system 100 includes a kiosk 102, a network 104 such as the Internet, and a networked server 106 that can optionally include a display 108. A user can interact with the kiosk 102 using a mobile computing device 110, such as a smart phone or tablet, that executes an application, or mobile app. The augmented reality kiosk system 100 can be configured to provide users information at a particular venue such as a trade show, a mall, a sporting event, and so forth.

In a configuration, the application executes on the mobile computing device 110 and determines whether the mobile computing device 110 is in close proximity to the kiosk 102, for example within the proximity region 112 as illustrated. In non-limiting examples, the proximity region 112 can be when the mobile computing device 110 is in visual range of the kiosk 102, or when the mobile computing device 110 and the kiosk can interact using a short-range wireless communication protocol such as near field communications. The application can determine that the mobile computing device 110 is in the proximity region 112 using global positioning system data, or GPS data. In another configuration, the kiosk 102 can determine when the mobile computing device 110 is in the proximity region 112, for example through a proximity sensor or using an optical sensor such as a digital camera or infrared (IR) sensor. In other configurations, the mobile computing device 110 and kiosk 102 can communicate through one or more wireless protocols, for example using WiFi, near field communications (NFC), over the Internet using cellular data communications, or any other suitable wireless protocol. In another configuration, the user can point a digital camera of the mobile computing device 110 at the kiosk 102, and the application can trigger an action based on successful identification of the kiosk 102. For example, the application can execute a pattern recognition algorithm to identify the kiosk 102 by shape, by markings on the kiosk 102, or through a barcode on the kiosk 102 for example a quick response (QR) code.

A user can select a desired image from a database of images using the mobile app, or using the touchscreen display of the kiosk 102. The desired image can be a celebrity, such as a sports figure, or any other suitable image. A second person can pose next to, or in front of, the kiosk 102. When the user focuses the camera of the mobile computing device 110 towards the kiosk 102, the selected image can be superimposed as an augmented reality image 116 onto a picture taken on the mobile computing device 110. In this way, the second person can have their picture "taken" with a virtual celebrity or any other desired augmented reality image 116. In a configuration, advertisements can be added to the augmented reality image 116 to promote the celebrity, or to promote products, services, or events. Advantageously, the advertisements can provide a revenue stream for the operator of the kiosk 110.

The kiosk 102 can collect data such as user choices and kiosk activity that can be analyzed for marketing purposes. In a configuration, the collected data can be used to assess charges associated with use of the kiosk 102 or augmented reality images 116. The charges can be assessed to a user, a sponsor, the venue owner, or other persons or companies. In a configuration, the mobile app that executes on the mobile computing device 110 can similarly collect data.

Figure 2:
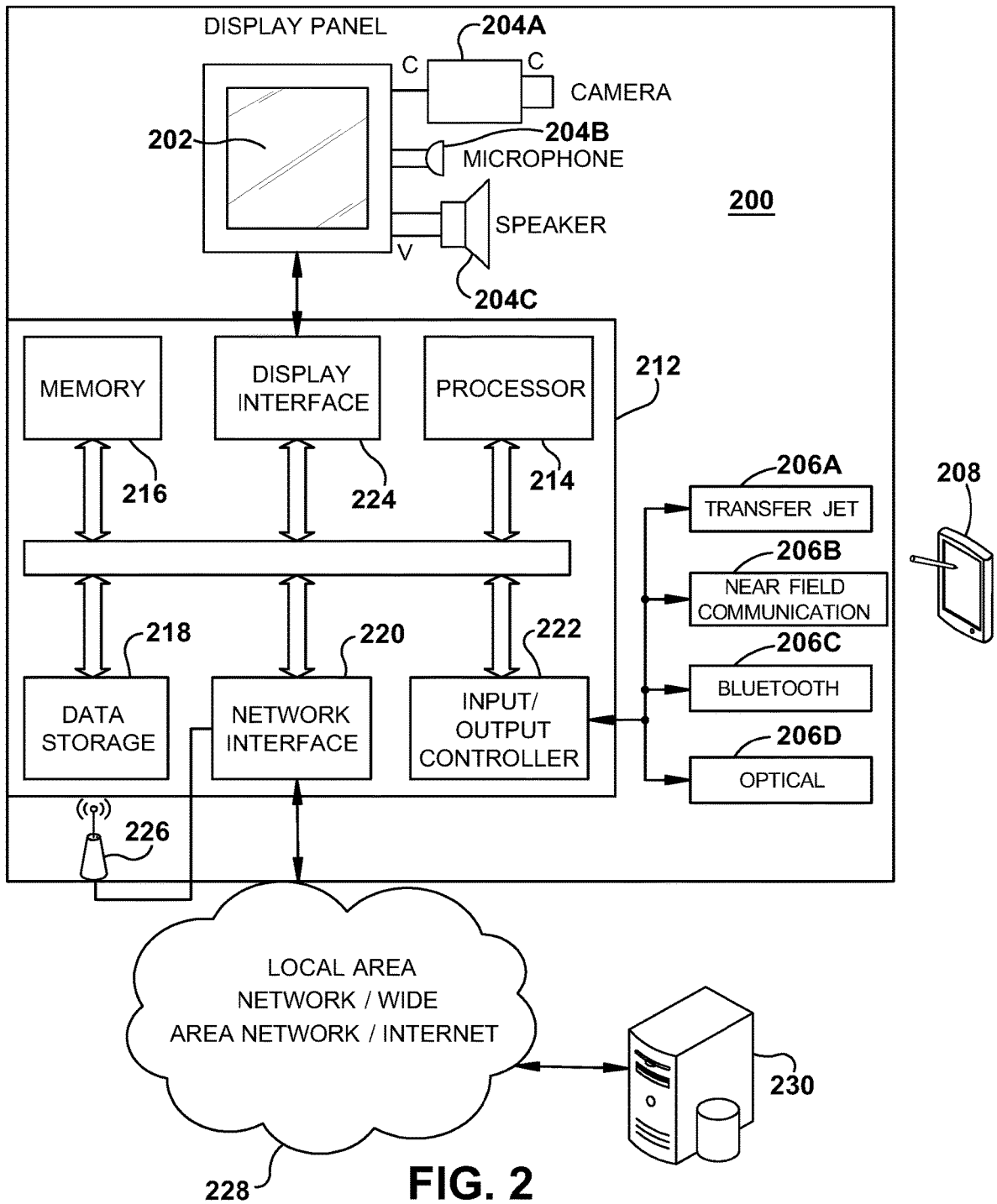
FIG. 2 is a block diagram of components of an augmented reality kiosk in accordance with an embodiment of the disclosure.

Referring now also to FIG. 2, a block diagram of example components of a kiosk 200 is presented. The kiosk 200 includes one or more computing devices 212. The computing device 212 can be any suitable computing device as would be understood in the art, including without limitation, a custom chip, an embedded processing device such as an embedded controller, a tablet computing device, a personal data assistant (PDA), a personal computing device, a desktop, a laptop, a microcomputer, a minicomputer, a server, a mainframe, or any other suitable programmable device. In some embodiments the computing device 212 can utilize cloud-based computing capabilities. In various embodiments disclosed herein, a single component can be replaced by multiple components and multiple components can be replaced by a single component to perform a given function or functions. Except where such substitution would not be operative, such substitution is within the intended scope of the embodiments.

The computing device 212 includes a processor 214 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 212 also includes one or more memories 216, for example read only memory (ROM), random access memory (RAM), cache memory associated with the processor 214, or other memories such as dynamic RAM (DRAM), static ram (SRAM), programmable ROM (PROM), electrically erasable PROM (EEPROM), flash memory, a removable memory card or disk, a solid state drive, and so forth. The processor 214 and memory 216 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

The computing device 212 also includes storage media 218. The storage media 218 can store copies of pictures or videos to be used as the augmented reality images in the pictures taken by the users. The storage media 218 can be a storage device that has multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media 218 also include flash drives, solid state hard drives, redundant array of individual disks (RAID), virtual drives, networked drives and other memory means including memories on the processor 214 or memories 216. It can be appreciated that such storage media 218 can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 220 can be configured to receive the augmented reality images from servers across a network 228, such as remote content servers 232. The augmented reality images can be stored locally on the mobile computing device 208, for example as part of the mobile app. The augmented images can be transmitted to the mobile computing device 208 when the user is in proximity to the kiosk 200, for example across the network 228 from the remote content server, or from the kiosk 200 using a wireless communications protocol.

The network and communication interfaces 220 can be an Ethernet interface, a radio interface 226, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 220 can include wired data transmission links such as Ethernet and TCP/IP. The communication interfaces 220 can include wireless protocols for interfacing with private or public networks 228. For example, the network and communication interfaces 220 and protocols can include interfaces for communicating with private wireless networks such as a WiFi network, one of the IEEE 802.11x family of networks, or another suitable wireless network. The network and communication interfaces 220 can include radio interfaces 226 and protocols for communicating with public wireless networks, using for example wireless protocols used by cellular network providers, including Code Division Multiple Access (CDMA) and Global System for Mobile Communications (GSM). A computing device 212 can use network and communication interfaces 220 to communicate with hardware modules such as a database or data store, or one or more remote content servers 232 or other networked computing resources. Any suitable communication protocol or combination of communication protocols can be used as would be understood in the art. Data can be encrypted or protected from unauthorized access.

In various configurations, the computing device 212 can include a system bus for interconnecting the various components of the computing device 212, or the computing device 212 can be integrated into one or more chips such as programmable logic device or application specific integrated circuit (ASIC). The system bus can include a memory controller, a local bus, and/or a peripheral bus in communication with interface cards for supporting various input and output devices 202, 204, 206, 210. Example input and output devices can include one or more displays 202, a camera 204A and microphone 204B (collectively video input 204), and a speaker 210 or audio output device. In a configuration, the display 202, video input 204, and speaker 210 can interface with the computing device through a display interface card 224 as illustrated as would be understood by one of ordinary skill in the art.

Other example input and output devices can include any suitable data communication interface including, but not limited to, a TransferJet™ interface 206A, a near field communications interface (NFC 206B), a BlueTooth™ interface 206C, and/or an optical interface 206D (collectively short range communication interfaces 206). An example optical interface 206D can include, but is not limited to, an infrared transceiver. The short range communication interfaces 206 can be configured wireless communicate with mobile computing devices 208 such as smartphones, tablets, and so forth. In a configuration, the short range communication interfaces 206 can interface with the computing device 212 through an input/output controller such as a Universal Asynchronous Receiver Transmitter (UART) or Universal Synchronous/Asynchronous Receiver Transmitter (USART) as would be understood in the art. Other input and output devices can include touchscreen interfaces, gesture or graphical input devices, keyboards, keypads, motion input devices, voice recognition units, vibratory devices, computer mice, and any other suitable user interfaces.

Figure 3A:
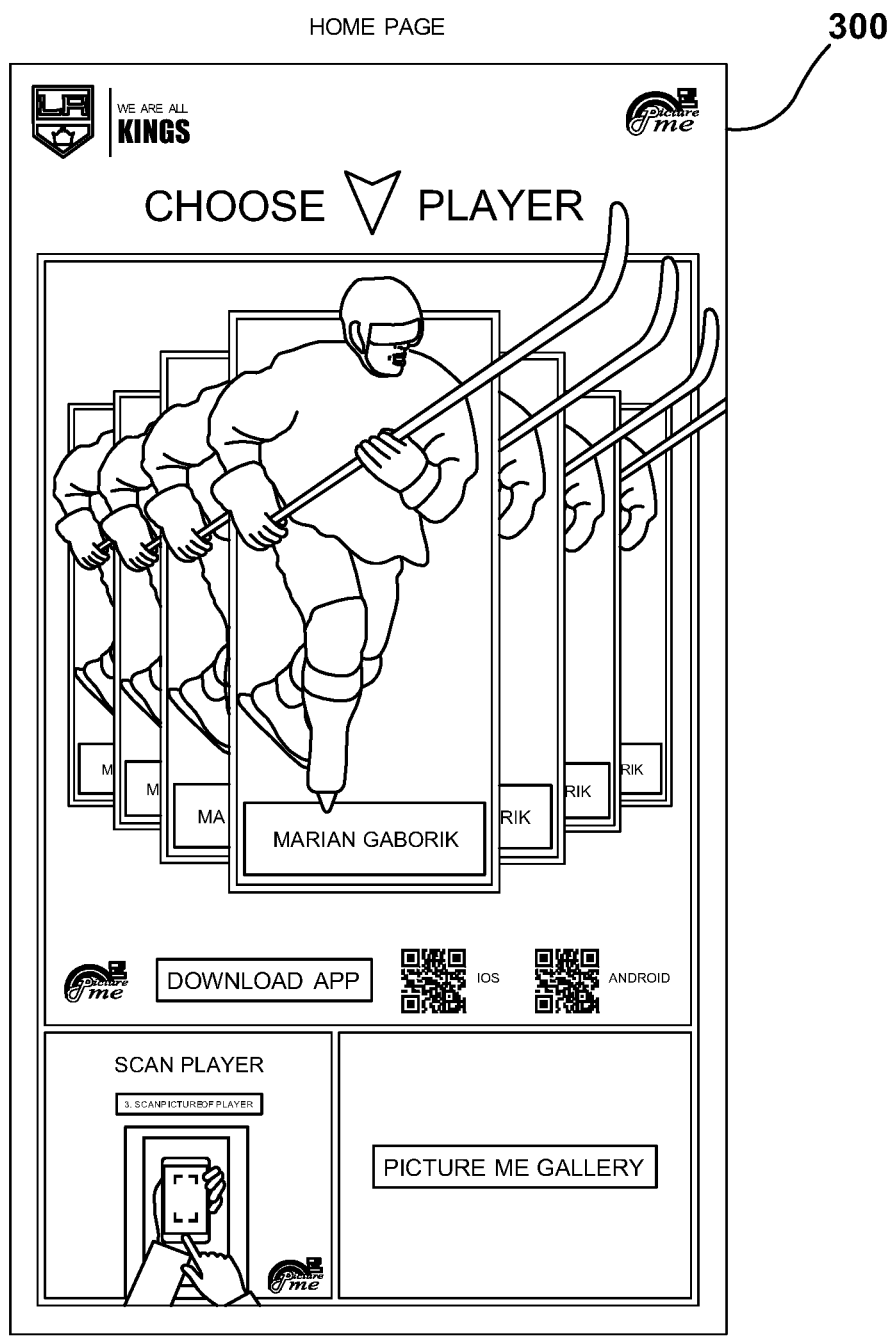
FIG. 3A is a screen shot of a home page of the augmented reality kiosk in accordance with an embodiment of the disclosure.
Figure 3B:
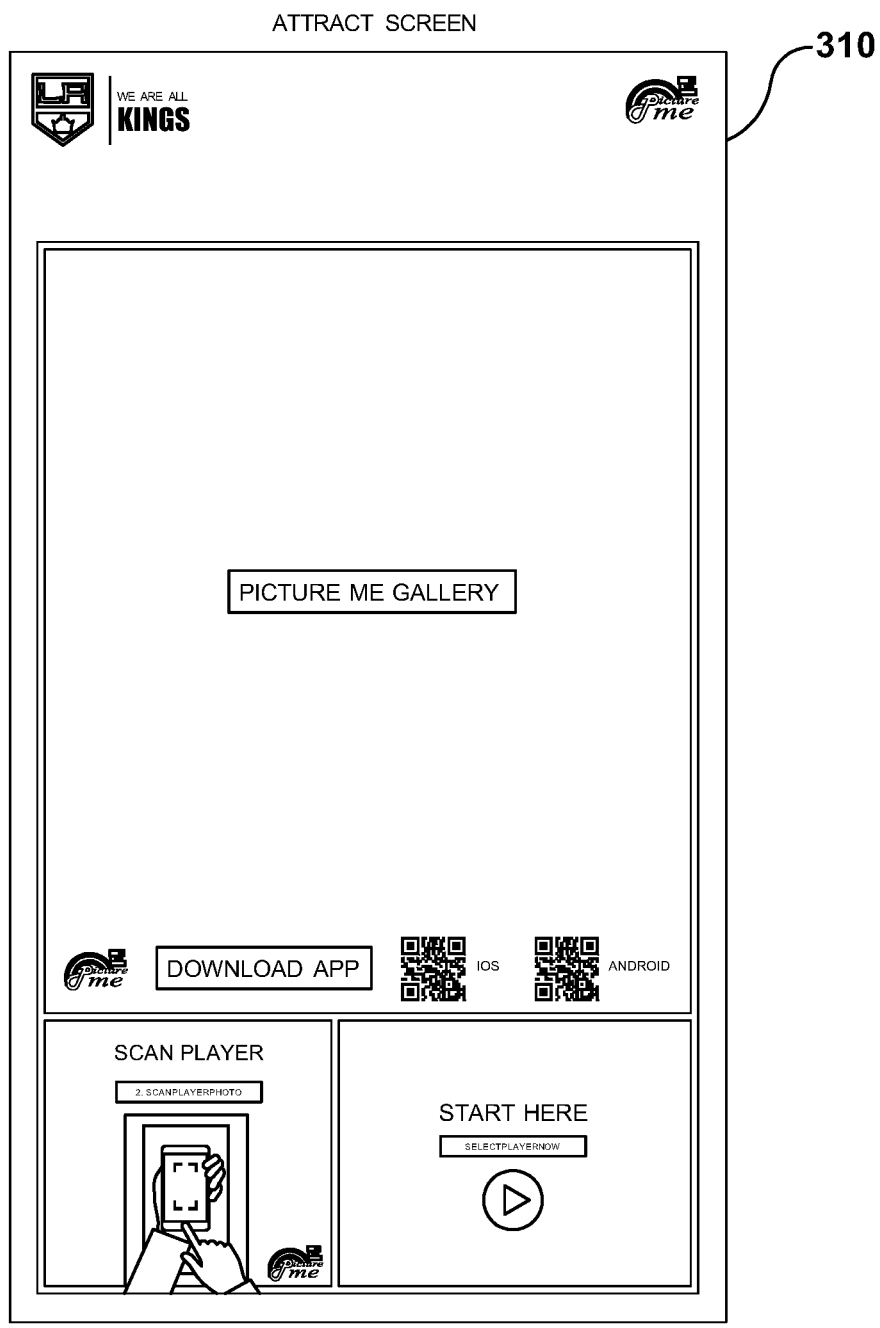
FIG. 3B is a screen shot of an attract page of the augmented reality kiosk in accordance with an embodiment of the disclosure.
Figure 3C:
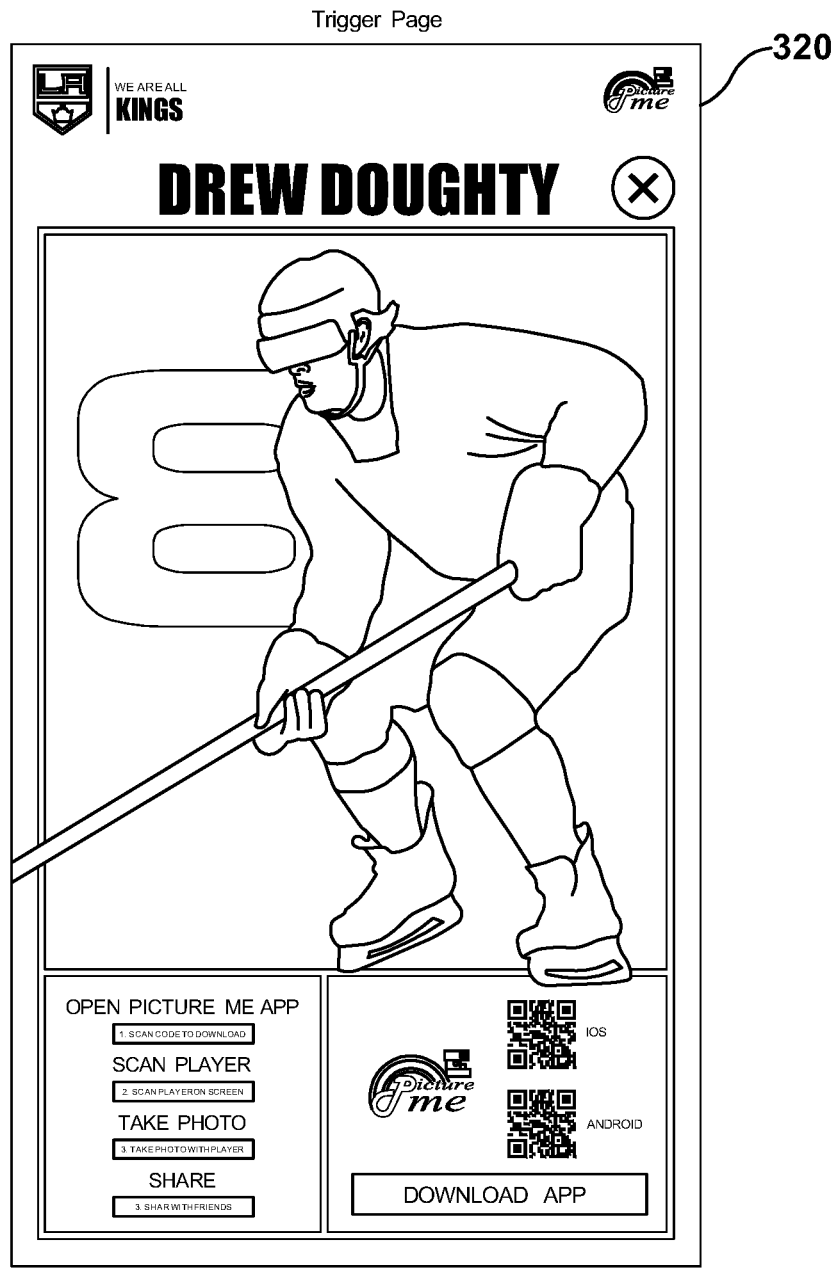
FIG. 3C is a screen shot of a trigger page of the augmented reality kiosk in accordance with an embodiment of the disclosure.

Referring also to FIG. 3, example screenshots of the display of the kiosk are presented. A home page 300 can display a carousel of trigger images. For example if the kiosk is promoting a sports team, the carousel of trigger images can be a gallery of images of the players of the sports team as shown. A user can scroll through the trigger images and select a desired image that is then displayed on a trigger page 310. On the trigger page 310, the user can select an action to be taken, for example to add the selected player as an augmented reality image overlaying portions of a picture taken by the user, or download the mobile app, among other possible actions. An attract page 320 can include a gallery or carousel of pictures, audio, or video configured to attract users to the kiosk. For example, fan photos or videos can be displayed on the display of the kiosk. Fan photos can be pulled from social media sites, for example an RSS feed can pull images from a FLICKR account associated with the sports team. The RSS feed can be polled periodically, for example every 2 minutes. Pictures and video that are displayed on the kiosk can be kept in a gallery that that a user can browse. The gallery can be curated periodically, for example to limit the number of images in the gallery, such as 50 images. The images can be sorted, for example by date or by frequency of use by users. Each time the attract page 320 is displayed, an updated gallery of images can be displayed to users.

Figure 4:
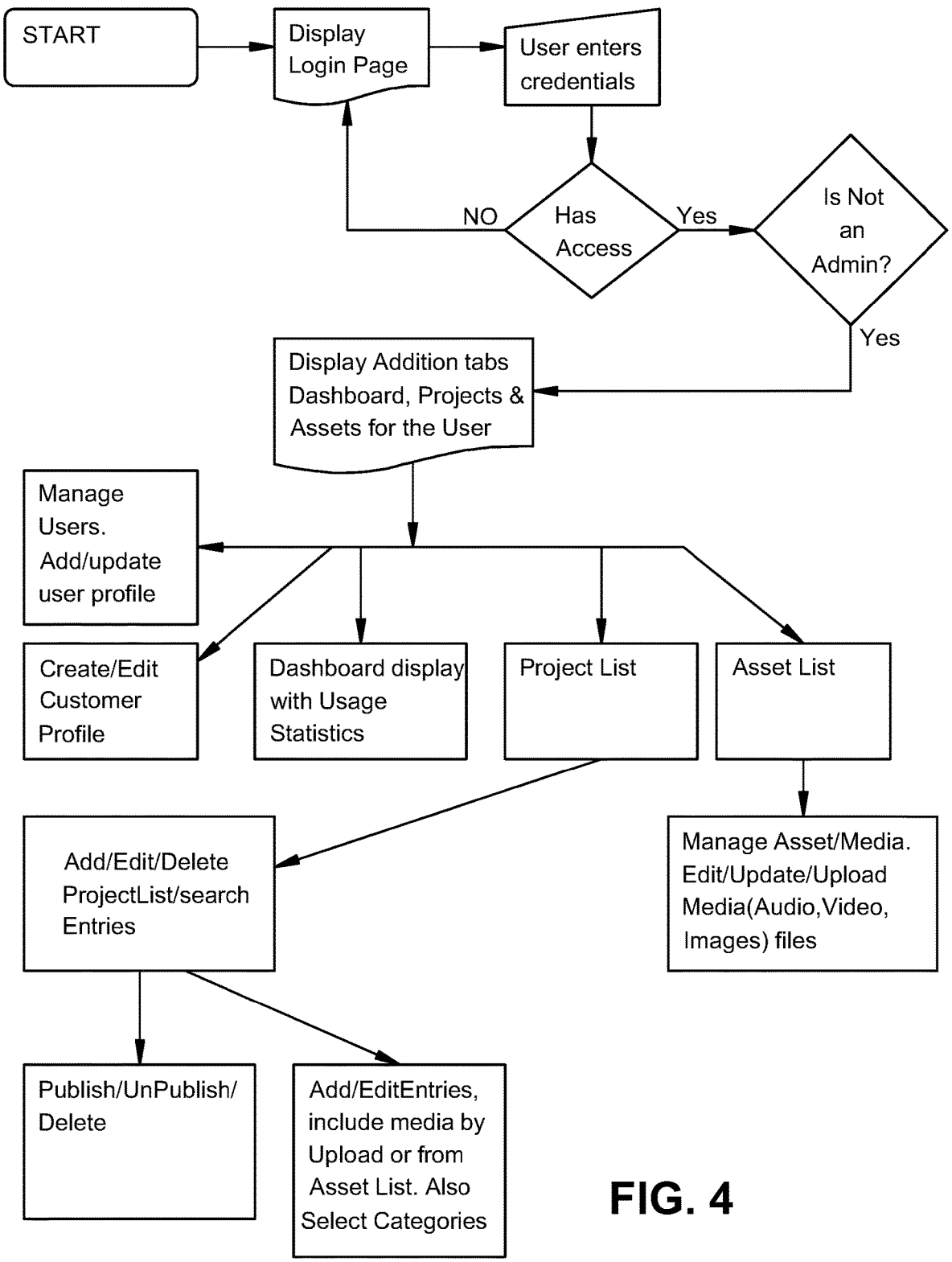
FIG. 4 is a diagram of example operations for a kiosk operator in accordance with an embodiment of the disclosure.
Figure 5:
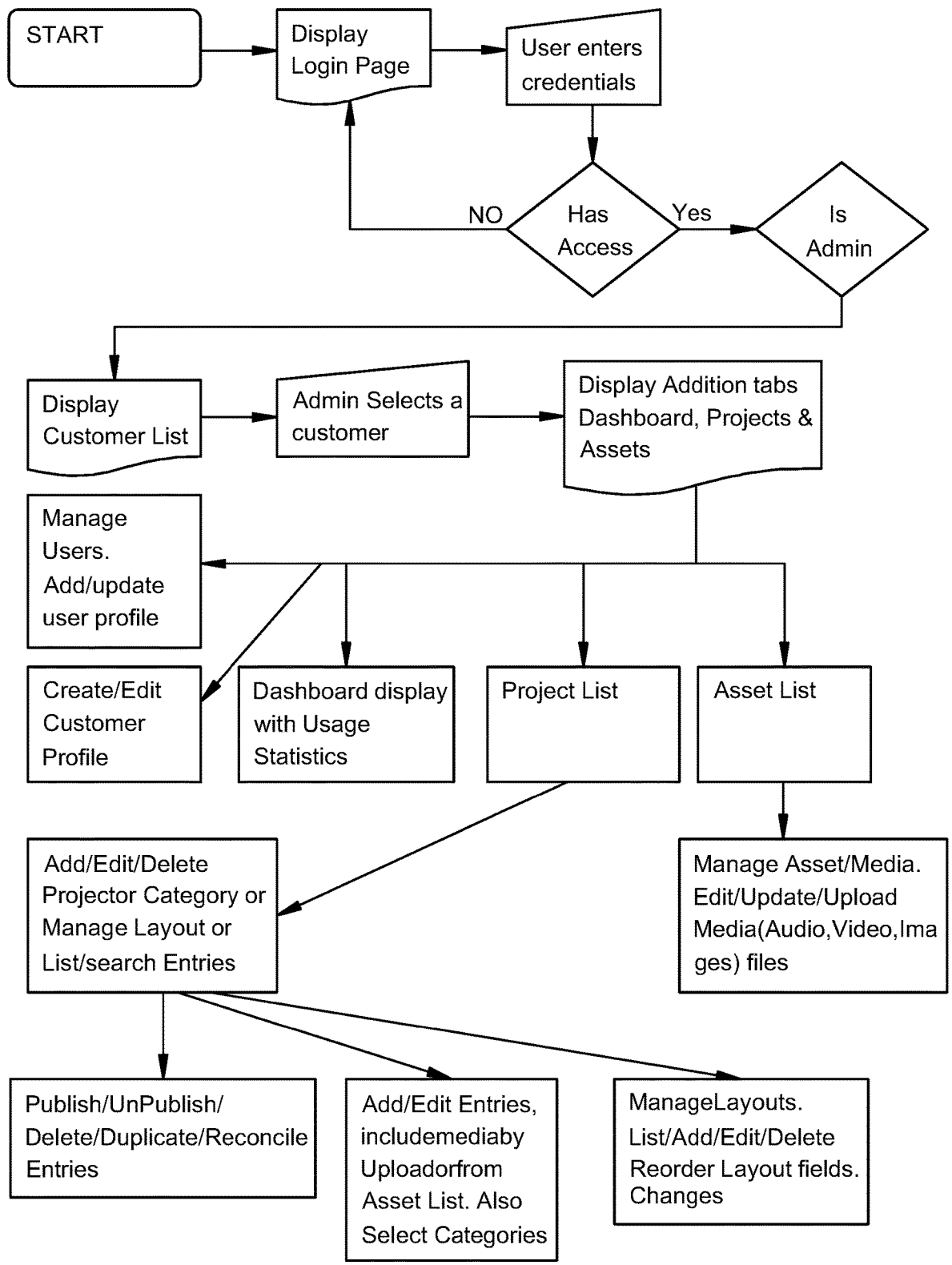
FIG. 5 is a diagram of example operations for a system administrator in accordance with an embodiment of the disclosure.
Figure 6:
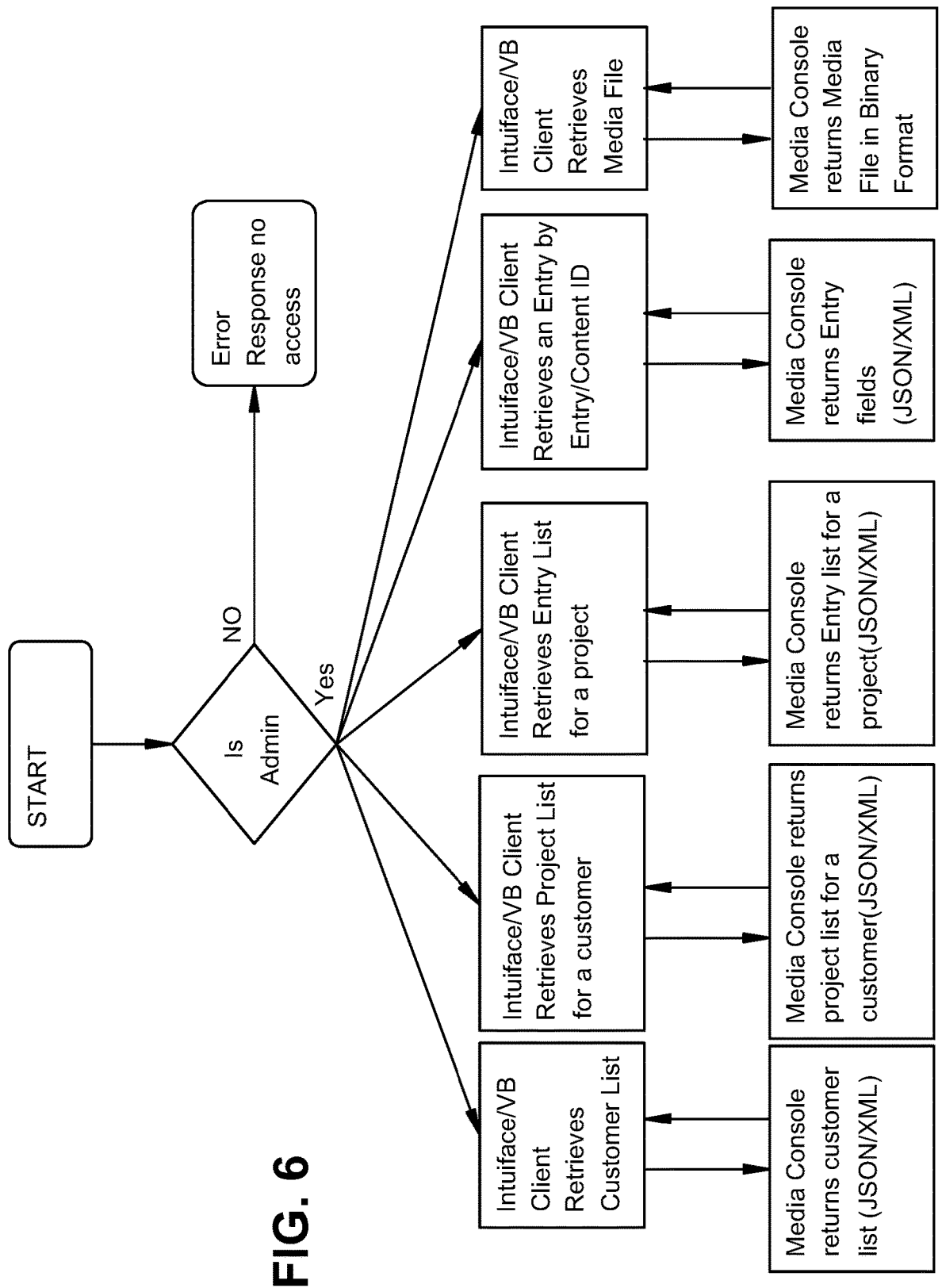
FIG. 6 is a diagram of example operations for uploading and downloading media in accordance with an embodiment of the disclosure.

Referring also to FIGS. 4, 5, and 6 flow diagrams of example operations for managing an interactive kiosk system are presented. In FIG. 4, example operations for operators of a kiosk are presented, which can include operator selection and curation of the media presented on the display of the kiosk, analytical information about consumer use of the kiosk, and other configuration choices. Because kiosks can be moved and reused in different venues at different times, it can be advantageous to have different projects stored in the kiosk that can be selected by the kiosk operator based on the venue. In FIG. 5, example operations for administrators of kiosks are presented, which can include all of the operations associated with FIG. 4 with the additional ability to configure the layout and user interfaces of the kiosk, and perform other associated administrative configuration options. In FIG. 6, example operations for uploading and downloading media, such as pictures, audio, and video, are presented.

Figure 7B:
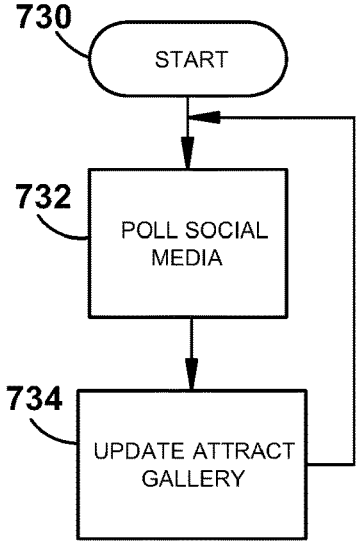
FIG. 7B is a flow diagram of example operations for generating an attract gallery of images in accordance with an embodiment of the disclosure.
Figure 7C:
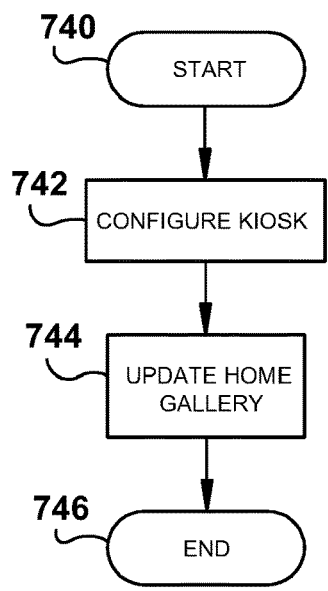
FIG. 7C is a flow diagram of example operations for configuring a kiosk in accordance with an embodiment of the disclosure.
Figure 7A:
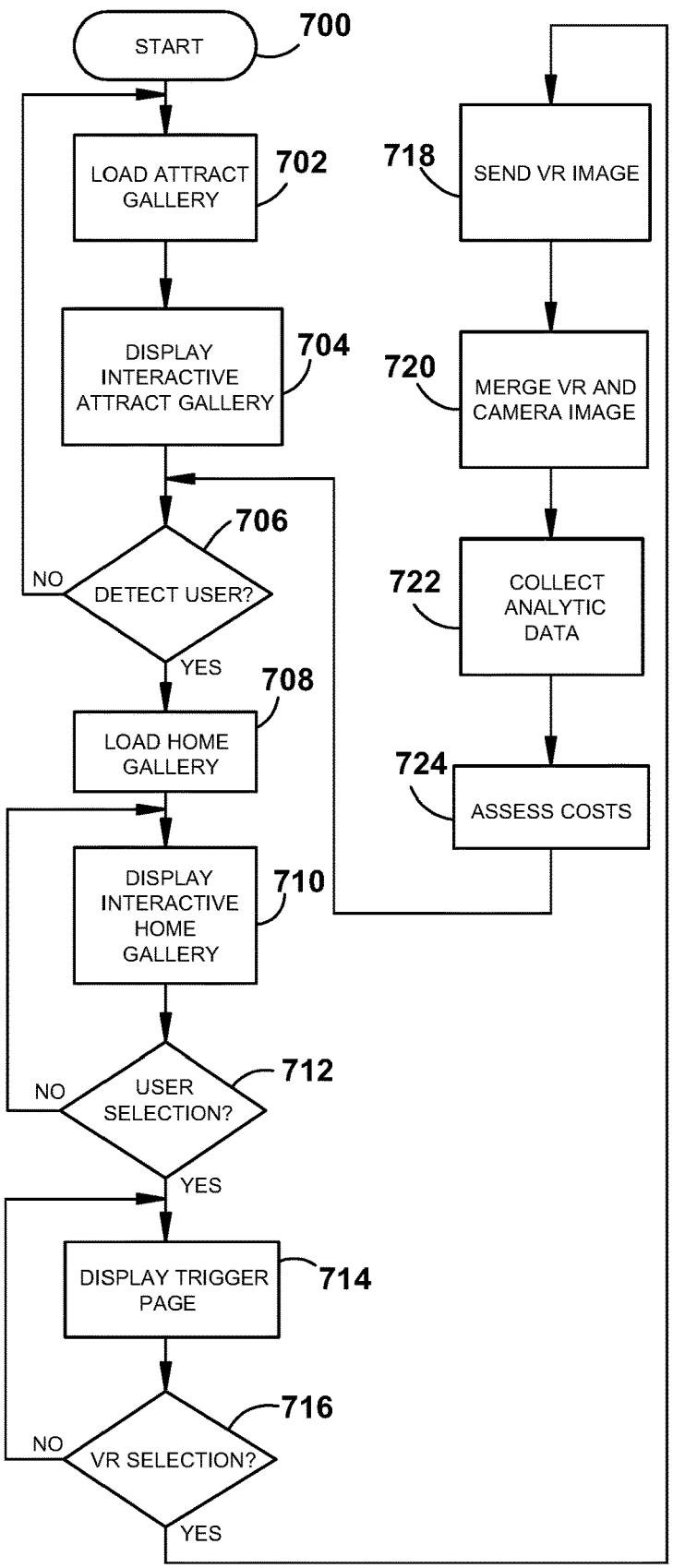
FIG. 7A is a flow diagram of example operations for adding augmented reality images to live images in accordance with an embodiment of the disclosure.

Referring also to FIG. 7A, a flow diagram of example processes of an interactive kiosk system is presented. The systems and processes described below can be performed on or between one or more computing devices and network servers. The processes described below can be performed in a different order as would be understood in the art. Processing begins at start block 700 and continues to process block 702.

At process block 702, the kiosk loads the appropriate attract gallery for the venue. For example, if the venue is a sporting event, the kiosk can load an attract gallery comprised of photos and videos from a team's social media page. Processing continues to process block 704.

At process block 704, the kiosk displays the attract gallery and users can interact with the attract gallery. For example, users can swipe through the attract gallery to look at different photos and videos. In a food concession configuration, the kiosk can display available food selections and promotions. Processing continues to decision block 706.

At decision block 706, if a mobile computing device of a user has been detected in proximity to the kiosk, then processing continues to process block 708, otherwise processing returns to process block 720 where the attract gallery can be reloaded with updated photos and video. The mobile computing device of the user can be detected in any suitable way. For example, a user in close proximity to the kiosk can use the camera of their mobile computing device to scan a barcode on the kiosk, for example a QR code that is displayed on the screen or a QR code displayed on an sticker attached to the kiosk. Scanning the barcode causes the mobile computing device to open the application store for the mobile device where the user can opt to download and execute an application for interacting with kiosks. When the user executes the application on the mobile computing device, the mobile computing device and the kiosk can interact and exchange data. For example, the application can use GPS data to determine when the mobile computing device is in proximity to a particular kiosk, and communicate with the kiosk through network communications or directly with the kiosk through a wireless communication protocol as described above. In another example, a QR code displayed on the kiosk can be scanned by the camera of the mobile computing device and used to identify and connect the application with the kiosk.

At process block 708, once a mobile computing device of a user has been detected in proximity to the kiosk, the kiosk can load an appropriate home gallery. For example, if the kiosk is promoting a sports team, or is in a sporting venue, the home gallery can be a carousel of photos of players on the sports team. In a food concession configuration, the kiosk can display food selections and promotions that can be selected by the user. In a configuration, the home gallery can be downloaded and displayed on the mobile computing device, and the user can interact with the home gallery on the mobile computing device similarly to how the user can interact with the home gallery on the kiosk. In a configuration, operations performed in the application can be mirrored on the kiosk, and vice versa. For example, if a user swipes through the home gallery on the mobile computing device, the kiosk display can be updated to reflect what is displayed on the kiosk as well. The application can display the home gallery, or a mobile variation of the home gallery, to the user. Processing continues to process block 710.

At process block 710, the kiosk displays the home gallery and users can interact with the home gallery. Continuing to use the example above, users can swipe through the home gallery to find the picture of a desired team player with whom the user desires to take an augmented reality picture. Processing continues to decision block 712.

At decision block 712, if a user selects one of the displayed pictures from the home gallery for the augmented reality picture, then processing continues to process block 714, otherwise processing returns to process block 710 where the user can continue to interact with the home gallery. Continuing to use the example above, users select the picture of the desired team player to use in the augmented reality picture.

At process block 714, the kiosk can display a trigger page to the user. The trigger page can include the picture to be used for the augmented reality picture, commands and configuration options, QR codes, and so forth. In a food concession configuration, the kiosk can display food customization options for the food item selected by the user. In a configuration, the application executing on the mobile computing device can display the trigger page or a mobile variation of the trigger page to the user. In a configuration, operations performed by the user on the kiosk can be mirrored on the application and vice versa. Processing continues to decision block 716.

At decision block 716, if a user selects to commence taking an augmented reality photo, then processing continues to process block 718, otherwise processing returns to process block 714 to continue displaying the trigger page.

At process block 718, the kiosk can transmit an image to the mobile computing device to be used for the augmented reality picture. The image can include transparent portions as well as portions with a picture of a player or other figure that are to be merged with images from the camera of the mobile computing device. The image can be transmitted locally using a suitable wireless communication protocol, or over a network using suitable network communication protocols. In a configuration, the image can be retrieved from memory on the mobile computing device or retrieved from a network server. For example, when the application is downloaded to the mobile computing device, the images to be used for the augmented reality picture can be part of the application or separately retrieved from a network server as would be understood in the art. Processing continues to process block 720.

At process block 720, the application executing on the mobile computing device merges the received image for the augmented reality photo with an image captured by the camera of the mobile computing device. In a configuration, the application can present the image over a live image from the camera. This configuration advantageously allows a user to position the received image with the other subjects in the photo. For example the augmented reality image can be presented as a cutout that with areas where a live person's face can be positioned to appear with the augmented reality image. The merged augmented reality photo can stored in the an image library on the mobile computing device, shared on social media, or forwarded to other users as would be understood in the art. Processing continues to process block 722.

At process block 722, analytics data can be captured by the kiosk and the application executing on the mobile computing device. Example analytics data can include, but is not limited to, user information, time and data information, which pictures were viewed on the kiosk or the application, which picture was used for an augmented reality photo, which kiosk was used, which commands were executed on the kiosk or the application, and so forth. The analytics data can be analyzed as would be understood in the art to produce useful marketing and trending data. Processing continues to process block 724.

At process block 724, the kiosk or application can assess costs and allocate fees and payments to the user, the kiosk operator, or third parties. For example, a user can be charged a small fee for use of a celebrity's image. In another example, the kiosk operator can be charged a fee for each use of a celebrity's image. In another example, payments can be made to third parties, for example to the celebrity for the use of their image in the augmented reality photo.

Referring also to FIG. 7B, a flow diagram of an example attract gallery image selection process is presented. Processing begins at start block 730 and continues to process block 732.

At process block 732, images can be polled from a third party source, for example a social media account such as a FLICKR account. The images can comprise stock photos and video, as well as live images and video. For example, live scores of an ongoing game or games, digital promotions for events and announcements, pictures of the venue, maps and details about the venue, as well as other pertinent information can be added to the attract gallery to be presented on the kiosk. In a configuration, the images can include digitally enhanced portions, for example a picture of a venue can include digital enhancements including painting certain areas of the venue to match a particular team's colors. Continues to process block 734.

At process block 734, the attract gallery can be updates using the images polled form the third party source. Processing returns to process block 732 where the third party source can be polled again at a preselected interval.

Referring also to FIG. 7C, a flow diagram of an example kiosk configuration process is presented. Processing begins at start block 740 and continues to process block 742.

At process block 742, the kiosk can be configured by a kiosk operator or administrator. For example, photos can be select to be used for the home gallery. The kiosk configuration can be controlled remotely by an associated content management system, allowing the operator or administrator to schedule experiences according to the venue's schedule. Different applications can be configured to execute on the kiosk, for example a tenant's application, a venue's application, or a standalone application. In a configuration, different day and nighttime variations can be configured. Processing continues to process block 744.

At process block 744, the home gallery on the kiosk is updated to include the photos selected at process block 742. Processing terminates at end block 746.

In an embodiment, the application executing on the mobile computing device can be configured to execute independently of a kiosk. For example, location information can be used to provide a wayfinding service to a user, for example to visibly guide the user to their seat in a venue using a visual device such as arrows, a bouncing ball, a holographic character, and so forth. In another example, in venues such as arenas, when the user points the camera of the mobile computing device at the arena floor, the application can overlay augmented reality images such as scores, player details, celebration effects when a goal is scored, as well as schedules of upcoming events such as half-time presentations, breaks, cheerleader or spirit performances, and so forth. Similarly, when the user points the camera around the venue, designated areas can trigger additional content such as logos, targeted advertisements, concession information and locations, player images, and so forth. Users can be rewarded for using the application with special offers, discounts, or points on associated rewards programs. In a configuration, users can share images taken on their mobile computing devices with social media accounts for presentation on kiosks, for example as images added to the attract gallery. In a configuration, the application permits the above actions only when the mobile computing device is in proximity to the kiosk.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A method, comprising:
   displaying one or more of a first set of images on a kiosk display;
   determining when a mobile computing device including a digital camera and an integrated camera display is in proximity to the kiosk;
   displaying one or more of a second set of images on the kiosk display when the mobile computing device is in proximity to the kiosk;
   displaying indicia corresponding to a plurality of human likenesses on the kiosk display;
   receiving a user selection of one of the plurality of human likenesses;
   communicating image data corresponding to a selected human likeness to the mobile computing device;
   displaying, on the camera display, an augmented reality image of a human corresponding to a selected human likeness in accordance with received image data;
   capturing live images of a live human on a camera associated with the mobile computing device;
   viewing, on the display, captured live images of the live human from the camera concurrently superimposed with the augmented reality image;
   posing the live human relative to the superimposed augmented reality image while in accordance with relative positions of the concurrent display of the live human and the selected human likeness positioned about the kiosk as determined by relative positions of the live human and the selected human likeness on the camera display; and
   capturing a selected still image of a positioned live human and the selected human likeness from the captured live images.

2. The method of claim 1, further comprising:
   transferring, to the mobile computing device, the augmented reality image associated with the user selection, wherein the augmented reality image is transferred from exactly one of the kiosk or a remote content server.

3. The method of claim 2, wherein the augmented reality image is transferred using one or more communications protocols selected from the group consisting of wireless communications, cellular data communications, near field communications, WiFi, Bluetooth, Transferjet communications, or optical communications.

4. The method of claim 1, wherein determining when a mobile computing device is in proximity to the kiosk includes scanning a bar code associated with the kiosk by a camera associated with the mobile computing device.

5. The method of claim 1, wherein the bar code is a QR code, and wherein the QR code is displayed on one or more of a sticker affixed to the kiosk, or a display of the kiosk.

6. The method of claim 1, wherein determining when a mobile computing device is in proximity to the kiosk includes comparing GPS position data of the mobile computing device with a location of the kiosk.

7. The method of claim 1, wherein determining when a mobile computing device is in proximity to the kiosk includes establishing a communications link between the kiosk and the mobile computing device.

8. A system, comprising:
   a kiosk that includes
      an interactive display configured to allow user interaction with the kiosk,
      a means for associating a mobile computing device with the kiosk,
      a wireless communications interface configured to transfer data with an associated mobile computing device, the mobile computing device including a digital camera and associated camera display,
      a user interface including a display configured to display indicia corresponding to a selectable set of human likenesses on the interactive display, and
      the user interface further configured to receive a user selection of a human likeness;
   wherein data transferred to the associated mobile computing device includes an augmented reality image of a selected human likeness positioned about the kiosk configured to be added to a live image taken by a camera of the associated mobile computing device;
   wherein the augmented reality image of the selected human likeness is displayed on the camera display superimposed concurrently with a live views of a human disposed by the kiosk as captured by the camera such that a position of the live human relative to image of the selected human likeness is selected by taking a picture with the camera when desired a user selected positioning of the human and the selected human likeness is present as determined by relative positions of the live human and the selected human likeness on the camera display.

9. The system of claim 8, further comprising:
   a media server associated with the kiosk that is configured to transfer image data with at least one of the kiosk and the associated mobile computing device,
   wherein the image data includes one or more of audio, video, pictures, or augmented reality images.

10. The system of claim 8, wherein the kiosk is configured to
    display one or more of a first set of images when a mobile computing device is not associated with the kiosk, and
    display one or more of a second set of images when the mobile computing device is associated with the kiosk.

11. The system of claim 10, wherein the kiosk is further configured to accept a user selection of one of the second set of images, and wherein the mobile computing device is further configured to receive an augmented reality image corresponding to the user selection.

12. The system of claim 11, wherein one or more of the kiosk or the mobile computing device is configured to collect analytic data associated with the user selection.

13. The system of claim 8, further comprising:
    the mobile computing device,
    wherein the mobile computing device is configured to receive the augmented reality image and merge the augmented reality image with a live image taken on a camera associated with the mobile computing device.

14. The system of claim 8, wherein the mobile computing device is selected from the group consisting of a smart phone, a tablet, a cell phone, a laptop, and a personal computing device.

15. The system of claim 14, wherein the mobile computing device is configured to present one or more augmented reality images on an associated display based at least in part on where the camera of the mobile computing device is pointed.

16. The system of claim 8, wherein the means for associating a mobile computing device with the kiosk is a QR code displayed on the kiosk, wherein the QR code includes identifying data of the kiosk, and wherein the mobile computing device is configured to read the QR code using a camera associated with the mobile computing device.

17. The system of claim 8, wherein the wireless communications interface includes a near field communication interface, and wherein the means for means for associating a mobile computing device with the kiosk is a near field communication transferred between the kiosk and the mobile computing device.

18. The system of claim 8, further comprising:
    a sensor displaced in the kiosk configured to identify a proximate mobile computing device, and
    wherein the means for associating a mobile computing device with the kiosk includes the sensor.

19. The system of claim 18, wherein the sensor is an optical device selected from the group consisting of a camera, and an infrared transceiver.

20. A kiosk, comprising:
    a kiosk display configured to
        display one or more of a first set of images when a mobile computing device is not in proximity of the kiosk, and
        display one or more of a second set of images when the mobile computing device is in proximity of the kiosk,
        display indicia corresponding to a plurality of selectable human likenesses, and
        receive a user selection of one of the plurality of human likenesses;
    an embedded controller configured to
        determine when the mobile computing device is in proximity of the kiosk,
        accept a user selection of one of the second set of images; and
    a communication interface configured to transfer an augmented reality image associated with the user selection to a mobile computing device including a digital camera configured to combine, on a camera display of the digital camera, the augmented reality image comprising a selected human likeness positioned about the kiosk and superimposed concurrently with a live images of a human, wherein relative positioning of the live images is determined by relative positioning in the camera display and the augmented reality image is selected by enabling the camera of the mobile computing device to take a picture.

* * * * *